Nov. 25, 1941.  S. BLOOMFIELD ET AL  2,263,714
METHOD OF MAKING TWO PLY TUBING
Filed April 1, 1940
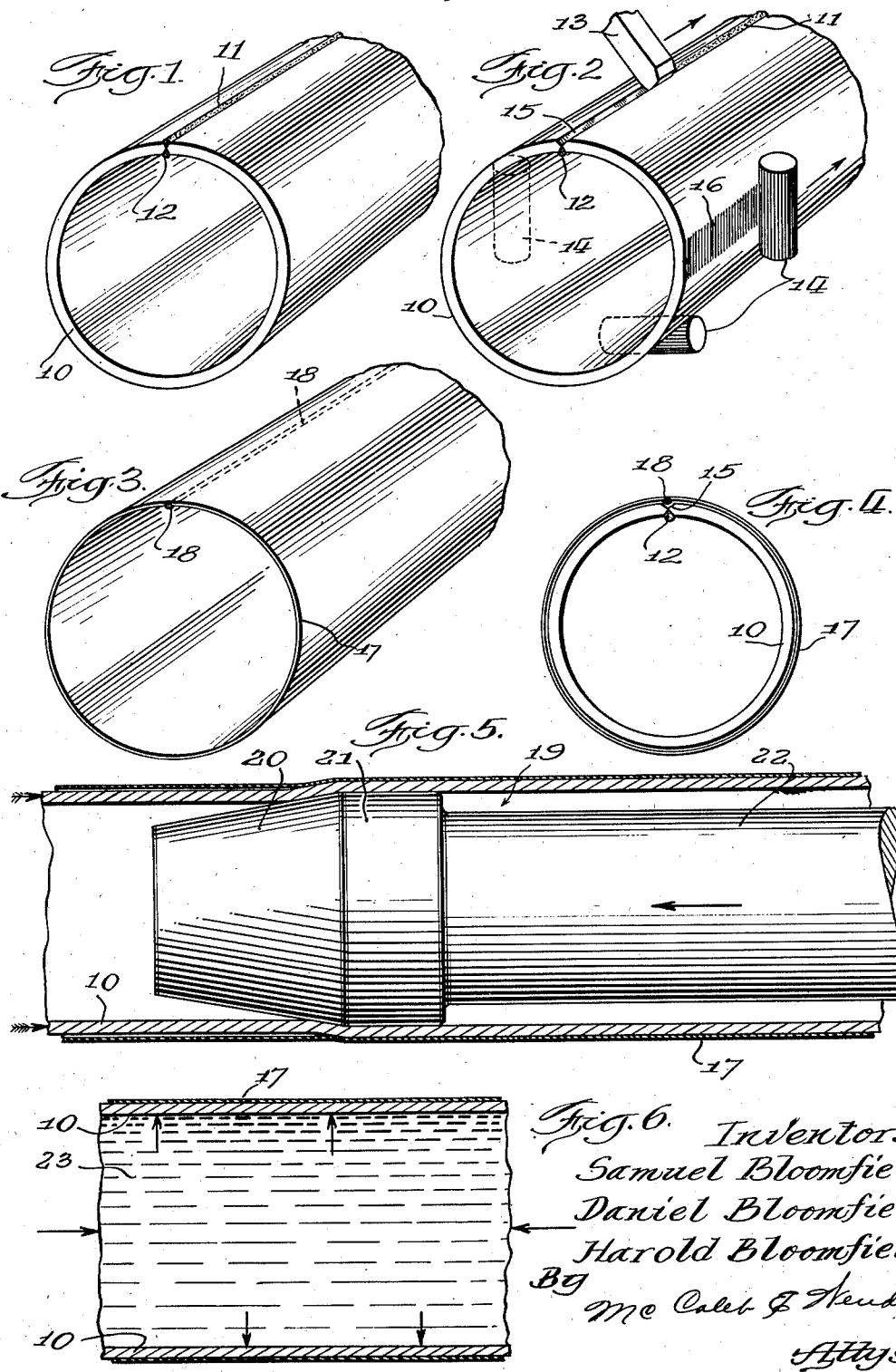

Patented Nov. 25, 1941

2,263,714

UNITED STATES PATENT OFFICE 2,263,714

METHOD OF MAKING TWO PLY TUBING

Samuel Bloomfield, Daniel Bloomfield, and Harold Bloomfield, Chicago, Ill.

Application April 1, 1940, Serial No. 327,210

1 Claim. (Cl. 29—188)

Our invention contemplates, provides and produces two ply tubing of a kind especially adapted for use in constructing modern furniture, e. g., two ply tubing consisting of a relatively thick core or body portion, in the nature of a cold rolled steel tube sheathed by, keyed to and expanded into a relatively very thin shell in the nature of a welded stainless steel tube.

While the compositions of the core tube and the sheath tube may vary within wide limits, the core tube will always be relatively thick and be formed of relatively cheap metal, whereas the sheath tube always will be relatively thin and be formed of relatively expensive metal of a kind which is rust and corrosion resistant.

Our invention is especially concerned with means for keying the relatively thick core tube and its relative thin sheath tube against relative rotation either during the formation of the two ply tubing or later, and for preventing longitudinal movement between the two plies after the relatively thick core tube has been forcibly expanded into its thin outer sheath to stretch the latter very tightly around such core tube. The expanding of the core, and the consequent circumferential stretching of the thin sheath tube is preferably effected hydraulically, e. g., by subjecting the inner surface of the core tube to the direct action of liquid under pressure, or by subjecting the said inner surface of the core tube to the expanding action of a suitable hydraulically actuated mandrel.

In the accompanying drawing,

Fig. 1 is a perspective view of a section of a welded tube of cold rolled steel, suitable for ultimate use as the core element of our improved two ply tubing;

Fig. 2 illustrates how such cold rolled steel tube may be operated upon before being inserted and expanded into its stainless steel sheath;

Fig. 3 is a perspective view of a section of a very thin stainless steel tube which is intended ultimately to become a tightly stretched sheath for the more heavy and less expensive tube depicted in Figs. 1 and 2;

Fig. 4 illustrates how the channelled and milled tube of Fig. 2 is inserted into the stainless steel tube of Fig. 3;

Fig. 5 diagrammatically illustrates one method of expanding the core tube, and simultaneously circumferentially stretching the sheath tube, in the manner contemplated by the present invention; and Fig. 6 diagrammatically illustrates another method of effecting such expansion and circumferential stretching.

Similar characters of reference refer to similar parts throughout the several views.

Referring first to Fig. 1, reference character 10 indicates a welded tube which may be assumed to have been formed, in a well known manner, from cold rolled steel sheet. The butt welding operation, involved in the production of such tube, has left the external and internal flash nibs 11 and 12, respectively, extending longitudinally of the tube.

Fig. 2 diagrammatically illustrates how we next work upon a tube of the kind depicted in Fig. 1. The tube 10 is moved longitudinally, in the direction of the arrows of Fig. 2, through a suitable machine (not shown) which comprises a slot cutter 13, and at least one milling roller 14. The cutter 13 removes the outer flash nib 11 of the tube 10 and leaves in its place a longitudinal groove 15 which conveniently may be of substantially V-shaped cross section. In Fig. 2, we have chosen to show three of the milling rollers, each adapted to mill a row 16, of closely disposed parallel lines, into the external surface of the tube 10. It should be understood, however, that the shape of the markings made on the tube exterior by the milling roller, or rollers, may be varied within wide limits.

In Fig. 3 we have shown a welded tube 17 which may be assumed to have been formed, in well known manner, from stainless steel sheet, such tube 17 carrying an internal longitudinally extending flash nib indicated at 18. It will be understood that such tube 17, immediately after being welded, also is possessed of an exterior flash nib, such exterior flash nib being removed, in the welding machine or otherwise, following the welding operation.

With respect to suitable proportions, in the matter of relative thicknesses of the cold rolled steel core tube 10 and the stainless steel sheath tube 17, we will say that we have experienced very satisfactory results, in the practice of our invention, when the core tube 10 has had an initial interior diameter of two and one-half inches (2½″) and a thickness of one eighth inch (⅛″), and has been encased within a sheath tube 17 having an initial thickness of fifteen one thousandths of an inch (15/1000″). Naturally, these proportions may be varied within rather wide limits.

In forming our improved two ply tube, the core tube 10, after being operated upon as depicted in Fig. 2, is inserted into the sheath tube 17, with the groove 15 of tube 10 receiving, as a key, the longitudinally disposed internal flash nib 18 of sheath tube 17. See Fig. 4.

Next we proceed to expand the core tube 10, and to stretch the sheath tube 11 around the core tube, in accordance with one or the other of the procedures indicated in Figs. 5 and 6.

In Fig. 5 reference numeral 19 indicates a tube expanding mandrel having a tapered end 20, a cylindrical surface 21 which determines the ultimate interior diameter of the core tube 10 and a shank 22. Such tube expanding mandrel is adapted to be projected, by any suitable hydraulically actuated mechanism (not shown) in the direction of the plain arrow (Fig. 5) to expand the core tube 10, and simultaneously stretch the sheath tube 17 around such core tube, when such core tube 10 is subjected to a reactive force acting in the direction of the feathered arrows (Fig. 5). It will not be necessary to illustrate the member which exerts the aforesaid reactive force upon the core tube 10. Neither will it be necessary to illustrate the devices whereby the expanding mandrel is projected into, and withdrawn from, the core tube 10 after expanding the latter, since the functioning of tube expanding mandrels, and the mechanism for operating same, are now well understood by persons skilled in the art to which our invention relates.

Naturally, a mandrel of the kind indicated in Fig. 5 will function to eliminate the interior flash nib 11 of the core tube 10. It will be noted in Fig. 4 that the flash 18 is of substantially the same area in cross section as the groove 15 in the corresponding relatively thick tube 10. This factor is important, since the relatively thin walled tube 17 would be distorted by any material disparity in size between the flash and its receiving groove.

When following the procedure diagrammatically illustrated in Fig. 6, we effect the necessary expanding of the core tube 10, and the consequent stretching of the sheath tube 17 around the core tube 10, by introducing liquid 23, under pressure, into the interior of core 10 in a manner also well known to the class of persons to whom this specification is directed. In view of the common use, at this date, of hydraulic pressure to expand tubes and other hollow metallic devices, it is believed that the purely diagrammatic showing of Fig. 6 will be ample for the purposes of the present specification.

The interior flash nib may be removed from any tube by pulling or projecting a suitable cutting tool through such tube, the tool being operated hydraulically or otherwise.

It should be understood that the method of the present invention may be utilized in providing a cold rolled steel tube with a stainless steel lining, by reversing the relative position of the tubes whenever it is desired to provide a two ply tubing with the stainless steel ply on the interior. In such case the groove to receive the flash would be on the inner face of the thicker or base metal tube 10, and the flash on the stainless steel tube would project outwardly from the outer surface of said tube.

Having thus illustrated and described our invention, what we regard as new and desire to secure by Letters Patent of the United States is:

The method of making two ply tubing which comprises forming a relatively thin walled tube of weldable sheet metal, of welding a longitudinal seam in said tube to form a projecting welding flash, of cutting a groove longitudinally in a relatively thick walled second tube to receive said flash, said groove being of not less cross sectional area than said welding flash, said second tube having a diameter to have free relative telescoping fit with the first tube, of telescopically interfitting the tubes, one within the other, with the longitudinal groove in the thicker tube in radial registry with the flash of the other tube, and of thereafter expanding the inner of said tubes into intimate interfitted relationship with the other tube, whereby the flash is interfitted in said groove without distorting either tube from its tubular form.

SAMUEL BLOOMFIELD.
DANIEL BLOOMFIELD.
HAROLD BLOOMFIELD.